US012246934B1

(12) United States Patent
Pajevic et al.

(10) Patent No.: US 12,246,934 B1
(45) Date of Patent: Mar. 11, 2025

(54) AUTOMATED CONTAINER STACKING STATIONS

(71) Applicant: Amazon Technologies, Inc., Seattle, WA (US)

(72) Inventors: Dragan Pajevic, Arlington, MA (US); Tim Martin, Casco, ME (US); Kevin John Trenholme, Stow, MA (US); Stephen E. McDonnell, Aurora, CO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/470,769

(22) Filed: Sep. 20, 2023

(51) Int. Cl.
*B65G 57/20* (2006.01)
*B65G 60/00* (2006.01)
*B65G 61/00* (2006.01)

(52) U.S. Cl.
CPC ............ *B65G 57/20* (2013.01); *B65G 60/00* (2013.01); *B65G 61/00* (2013.01); *B65G 2201/0235* (2013.01); *B65G 2203/0233* (2013.01)

(58) Field of Classification Search
CPC ...... B65G 57/00; B65G 59/06; B65G 59/063; B65G 59/062; B65G 59/102; B65G 59/103; B65G 59/00; B65G 59/061; B65G 57/165; B65G 59/067; B65H 2301/42122; B65H 2301/42322
See application file for complete search history.

(56) References Cited

U.S. PATENT DOCUMENTS

| 2,453,545 | A | * | 11/1948 | Simpson | B21D 43/24 414/797.9 |
| 3,160,292 | A | * | 12/1964 | Albrecht | G07F 7/0636 186/52 |
| 3,370,724 | A | * | 2/1968 | Burns | B65G 59/062 414/795.8 |
| 5,785,482 | A | * | 7/1998 | Tanaka | B65G 1/0485 414/273 |
| 6,422,806 | B1 | * | 7/2002 | Jenkins | B65G 57/303 414/794.9 |
| 7,717,665 | B2 | * | 5/2010 | Jenkins | B65G 57/302 254/89 R |
| 7,731,473 | B2 | * | 6/2010 | Yuyama | B65G 65/00 414/416.05 |

(Continued)

FOREIGN PATENT DOCUMENTS

| CN | 110143446 A | * | 8/2019 | ........... B65G 1/0407 |
| CN | 110155734 A | * | 8/2019 | |

(Continued)

*Primary Examiner* — Gregory W Adams
(74) *Attorney, Agent, or Firm* — Eversheds Sutherland (US) LLP

(57) ABSTRACT

Systems and methods are disclosed for automated container stacking stations. In one embodiment, an example system may include a housing having a first side and a second side, a lifting component configured to lift a first container from a first position to a second position, and to lower the first container from the second position to a third position, such that the first container is stacked on a second container, and a container centering component having a first container engagement member and a second container engagement member, the container centering component configured to align the first container in a predetermined position.

18 Claims, 16 Drawing Sheets

(56) References Cited

U.S. PATENT DOCUMENTS

| | | | | |
|---|---|---|---|---|
| 10,035,666 B2 * | 7/2018 | Redman | ................... | B65G 1/00 |
| 2022/0242683 A1 * | 8/2022 | Jackson | ............... | B65G 59/067 |

FOREIGN PATENT DOCUMENTS

| | | | | | |
|---|---|---|---|---|---|
| CN | 110713014 B | * | 5/2021 | ............. | B65G 17/00 |
| CN | 113086657 A | * | 7/2021 | | |
| WO | WO-2016051509 A1 | * | 4/2016 | ............... | B08B 3/02 |

\* cited by examiner

AUTOMATED CONTAINER STACKING STATIONS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
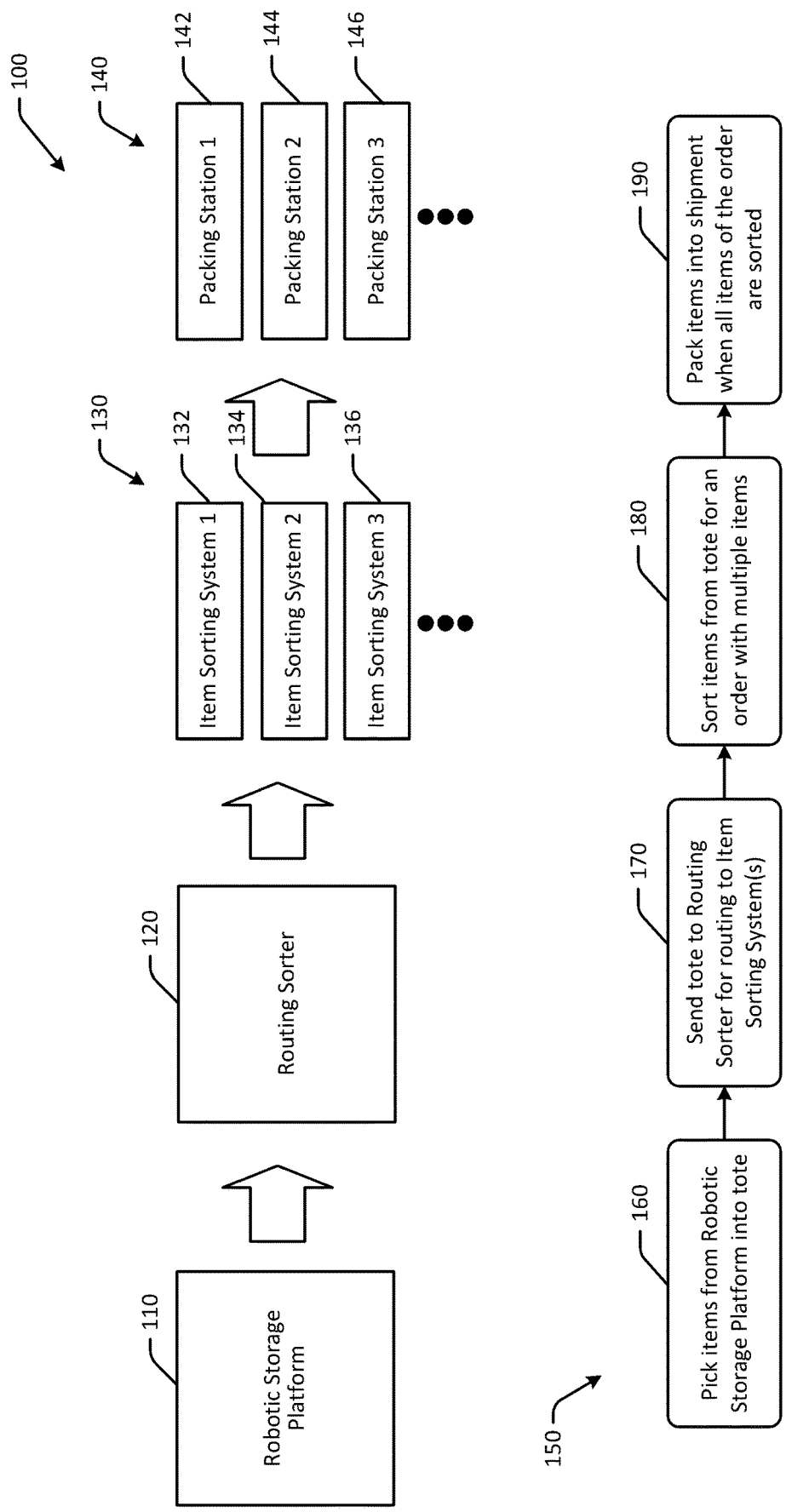
FIG. 1 is a hybrid schematic illustration of an example use case for automated container stacking stations and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers or packages for transport, sortation, etc., the packages may be placed in foldable or non-foldable containers that are configured to hold a plurality of packages. For example, a foldable container may be filled with packages that are destined for another fulfillment center or other facility. The foldable containers described herein may be used not only to store and transport packages or other items within a facility, but may also be used to transport the packages to another facility. For example, in some embodiments, the foldable containers may be filled with packages, and the filled foldable container may be loaded onto a truck and transported to another facility. At the destination facility, the entire foldable container may be unloaded from the truck and scanned to identify the contents of the foldable container, without having to empty the foldable container. This may allow for increased efficiency and reduced handling of individual packages, and may also provide the ability for foldable containers to be used across any number of facilities and/or workstations within a facility.

Once the container is unloaded from a truck, or otherwise reaches its destination within a facility (e.g., if the foldable container does not leave a facility, etc.), the container may be dumped so as to remove its contents (e.g., from its open top, etc.). For example, the container may be dumped onto a conveyor, such that the packages or other items inside the container fall onto the conveyor. Containers may be dumped manually (e.g., using equipment, etc.) or automatically.

During shipment of filled or empty containers, utilization of space during transport may be optimized by containers, such as those described herein. For example, empty containers may be shipped or transported in folded configurations using a trailer or semi-truck. Embodiments may maximize utilization of space inside the trailer or other transport system by providing a number of different stacking arrangements and/or folding configurations so as to use most or all of the available shipment space. In addition, embodiments may be stackable when filled, so as to provide improved trailer utilization when shipping filled containers. Embodiments may be deployed to existing environments and may therefore be compatible with both manual and robotic handling.

Embodiments of the disclosure include automated container stacking stations. Some embodiments include features that allow for stacking and/or folding of filled or empty containers that allow for maximization of trailer space during shipment of filled or empty containers, and also allows for improved space utilization during shipment of filled containers. Some automated container stacking stations are configured to engage containers having open undersides, allowing autonomous robots to bring the containers into and out of the cell. Embodiments may be configured to stack and unstack open and collapsed containers. Some embodiments may have a pass-through configuration, where containers are inserted on one side and removed on the other side. Alternate configurations may have where insertion and removal on the same side, so as to save space by placing the station or system against a wall or column. Some embodiments may be fixed units, whereas other embodiments may be mobile. Embodiments may be used with containers that provide ergonomic features to facilitate manual handling of foldable containers. U.S. patent application Ser. No. 17/202,693, titled "Foldable Containers for Manual and Robotic Use," describing various features of a foldable container for manual and robotic use, is hereby incorporated by reference in its entirety.

Embodiments of the disclosure may increase a stacking and unstacking time for containers. Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for automated container stacking stations and an example process flow is depicted in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. For example, the packages may be placed into foldable containers for shipment to another fulfillment center, a sort center, or another facility. At the subsequent facility, the container may be dumped to remove its contents. Such containers may be stacked and unstacked using automated container stacking systems prior to or after loading into trailers.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
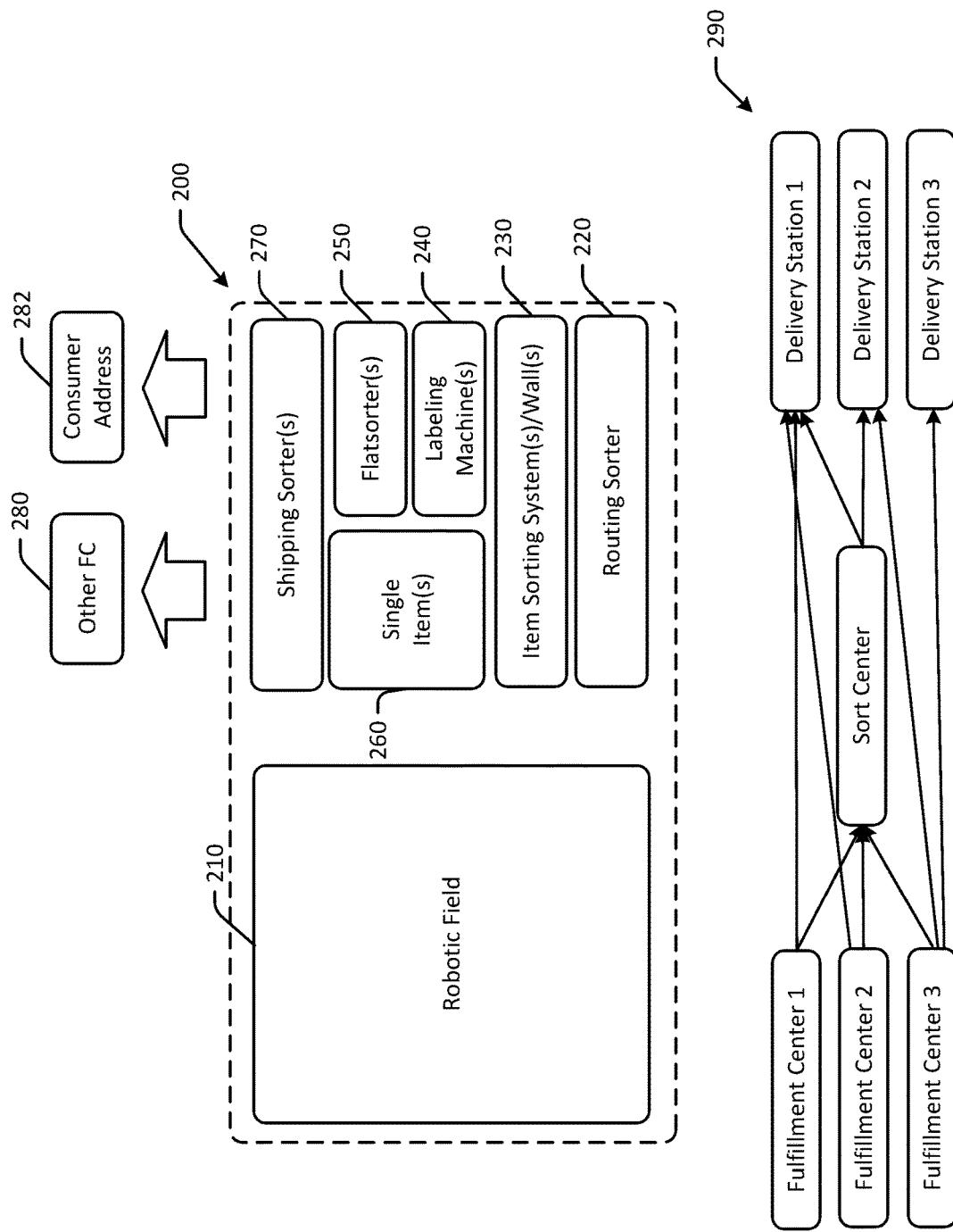
FIG. 2 is a hybrid schematic illustration of an example use case for automated container stacking stations throughout a facility and between facilities in accordance with one or more embodiments of the disclosure.

FIG. 2 is a hybrid schematic illustration of an example use case for automated container stacking stations throughout a facility and between facilities in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments of the automated container stacking stations described herein may be used to stack and unstack filled or empty containers at various points along the distribution channel, as containers move from a first facility to a second facility, a third facility, and so on, so as to seamlessly move amongst different facilities in a fulfillment network. For example, a foldable container may move from a fulfillment center to a sort center, and then on to a delivery station or other facility, thereby providing a flexible and dynamic solution without having to unload contents of the foldable container. At any of the locations, the foldable containers may be dumped with reduced jams.

Certain embodiments may improve processing speed and/or throughput of fulfillment centers. Certain embodiments may improve performance of mechanical equipment for sortation and/or consolidation of items for multi-item orders via improved stacking and unstacking speed. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 3A:
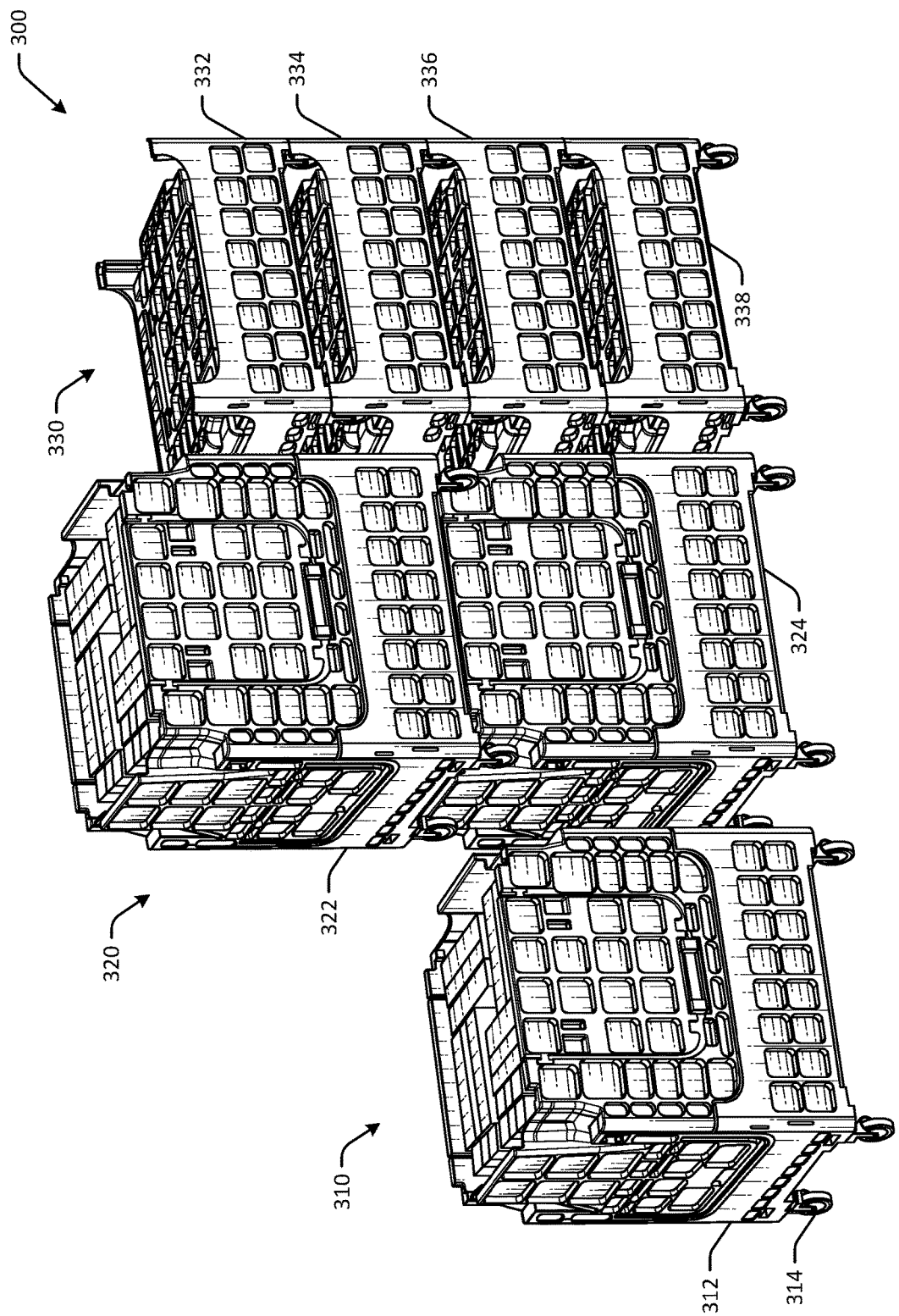
FIGS. 3A-3C are schematic illustrations of a various views of a container in folded, erected, and stacked arrangements in accordance with one or more embodiments of the disclosure.
Figure 3B:
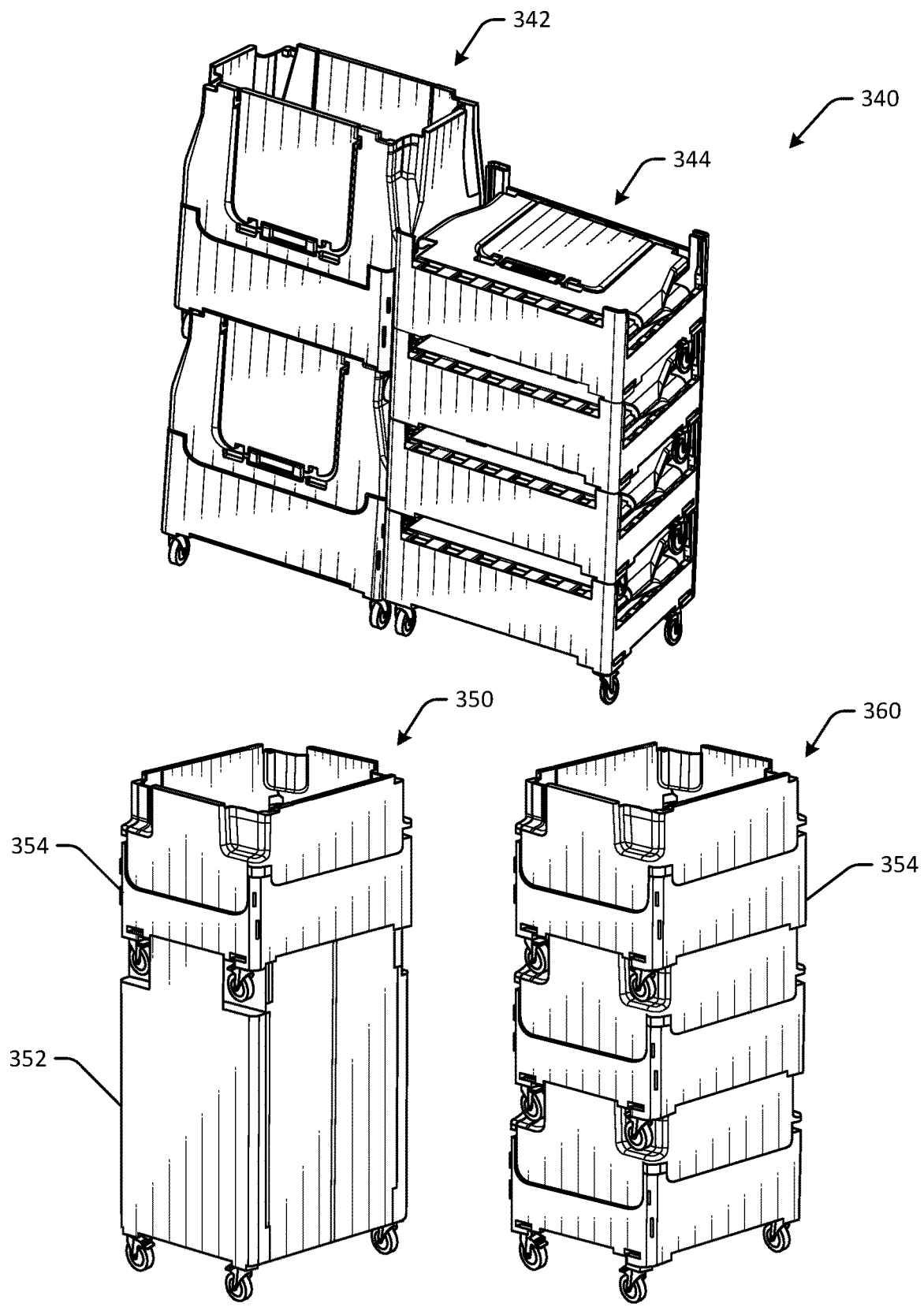
Figure 3C:
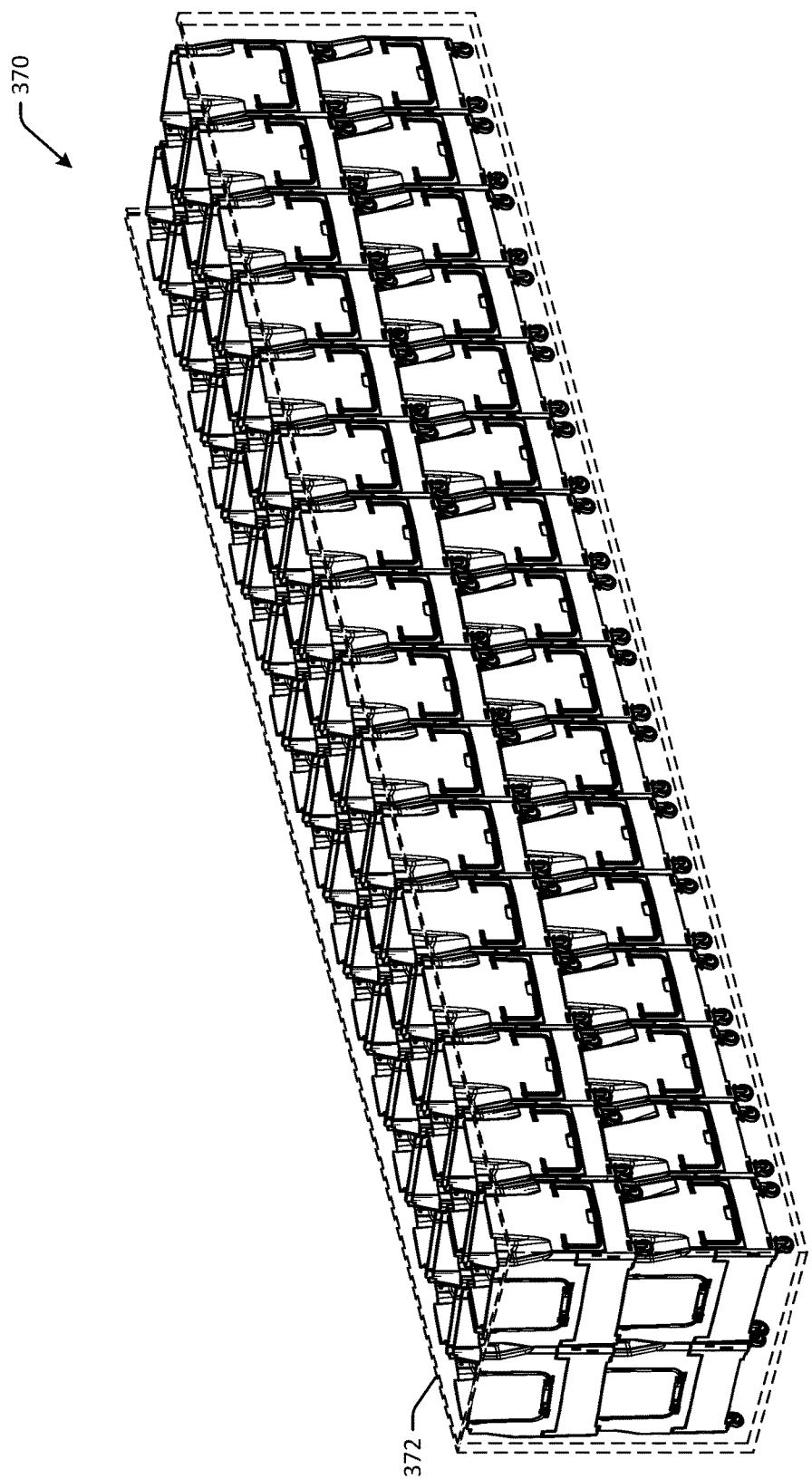

FIGS. 3A-3C are schematic illustrations of a various views of a container in folded and stacked arrangements in accordance with one or more embodiments of the disclosure. Other embodiments may include additional or fewer components. The illustrations of FIGS. 3A-3C may not be to scale, and may not be illustrated to scale with respect to other figures. The containers illustrated in FIGS. 3A-3C may be the same containers discussed with respect to FIGS. 1-2.

In FIG. 3A, a number of containers are depicted in a stacked arrangement 300. The containers may include a first stack 310 with a filled container 312, a second stack 320 with a first filled container 322 stacked on a second filled container 324, a third stack 330 of a first folded container 332, a second folded container 334, a third folded container 336, and a fourth folded container 338. Any number of containers may be included and filled containers may be stacked with folded empty containers as desired.

The containers may be open top foldable containers that include a rear wall configured to rotate toward a center of the foldable container, a first sidewall coupled to the rear wall, the first sidewall configured to rotate toward the center of the foldable container, the first sidewall having a first rotating door configured to rotate about 180 degrees relative to the first sidewall, a second sidewall coupled to the rear wall, the second sidewall configured to rotate toward the center of the foldable container, the second sidewall having a second rotating door configured to rotate about 180 degrees relative to the second sidewall, and a front wall configured to rotate toward the center of the foldable container. The containers may include a handle coupled to the front wall, the handle configured to rotate outwards at least 90 degrees relative to the front wall, and a base having a first post disposed in a first corner, a second post disposed in a second corner, a third post disposed in a third corner, and a fourth post disposed in a fourth corner. One or more wheels including a first wheel offset from the first corner, a second wheel offset from the second corner, a third wheel offset form the third corner, and a fourth wheel offset from the fourth corner may be included. The first sidewall and the second sidewall may be at a fixed vertical position relative to the base, and the first post may have a first cutout configured to receive a corresponding protrusion on a lower surface of the base, such that another foldable container can be stacked on top of the foldable container, as depicted in the third stack 330.

To move throughout an environment, the containers, such as the filled container 312, may be rolled using one or more wheels 314. For example, a manual operator may move the filled container 312 by pushing or pulling the filled container 312 from one location to another. The filled container 312 may receive, carry, and transport various packages, boxes, items, products, or other objects of various types. In addition, the filled container 312 may be configured to be lifted, carried, moved, and placed between positions within a material handling facility by robotic drive units, such as an autonomous robot, or other material handling equipment. In this manner, the filled container 312 can be pushed by associates on surfaces, e.g., sort center floors, and the filled container 312 can also be carried and transported by robotic drive units.

The filled container 312 may also be moved using a robot, such as an autonomous robot. For example, the robot may be configured to tunnel or otherwise position itself underneath the filled container 312. The robot may then lift the filled container 312 off the ground, such that the wheels are separated from the ground, and the robot may then transport the filled container 312 from one location to another. Accordingly, the filled container 312 may be configured to be transported using both (i) the one or more, or plurality, of wheels via manual pushing, and (ii) robotic manipulation to lift and move the filled container 312, such as by the robot.

The wheels 314 may include one or more freely-rotating swivel casters associated with a bottom surface of the filled container 312. For example, the filled container 312 may include four freely-rotating swivel casters, with one positioned at each corner of the filled container 312. In some examples, two of the four casters may have a swivel locking feature, such as a manually or foot-operated swivel locking feature, and the other two of the four casters may have a caster rotation locking feature, such as a manually or foot-operated caster rotation locking feature. In some embodiments, the caster wheel assemblies may be self-positioning swivel caster mechanisms, such as those described in U.S. patent application Ser. No. 16/787,930, filed Feb. 11, 2020, the entirety of which is hereby incorporated by reference.

The wheels 314 may be self-positioning swivel casters may have associated home positions that may be defined positions or orientations of the swivel casters when lifted, stationary, and/or stopped. For example, the home positions of self-positioning swivel casters associated with a container, cart, or other material handling equipment may increase or maximize space or clearance under the cart when the cart is stationary or stopped. In some example embodiments, robotic drive units or other types of material handling equipment, e.g., manual, automated, or robotic equipment, may be inserted or placed under the cart and between the self-positioning swivel casters, such that increasing or maximizing space or clearance under the cart and between the self-positioning swivel casters may facilitate reliable operations and prevent collisions or interferences between robotic drive units and portions of the cart. In other example embodiments, the home positions of self-positioning swivel casters associated with a container, cart, or other material handling equipment may be positioned substantially within an outer periphery, dimensions, or footprint associated with a receptacle of the cart when the cart is stationary or stopped, such that a plurality of carts may be positioned or stored adjacent to each other with minimal gap or clearance therebetween and without causing interference between respective swivel casters associated with adjacent carts. In addition, the home positions of self-positioning swivel casters associated with a cart or other material handling equipment may enable a cart to substantially remain in position when lifted, stationary, or stopped. For example, a cart may be placed at a position on a substantially flat or horizontal floor or other surface of a material handling facility. However, due to irregularities, imperfections, protrusions, indentations, edges, slopes, angles, cracks, debris, or other surface characteristics associated with the surface, a cart that is stationary or stopped may move or drift, e.g., due to gravity. The home positions of self-positioning swivel casters may be selected or configured to prevent such movement or drift of a cart due to surface characteristics associated with a position at which the cart is placed.

The wheels 314 may include a first wheel that is offset with respect to a first corner of the base of the container, so as to facilitate stacking of the filled container 312 with other containers. The wheels 314 may include a second wheel that is offset with respect to a second corner of the base, a third wheel that is offset with respect to a third corner of the base, and a fourth wheel that is offset with respect to a fourth corner of the base. The posts of the base may have cutout features configured to receive a portion of a base of another container.

Figure 4A:
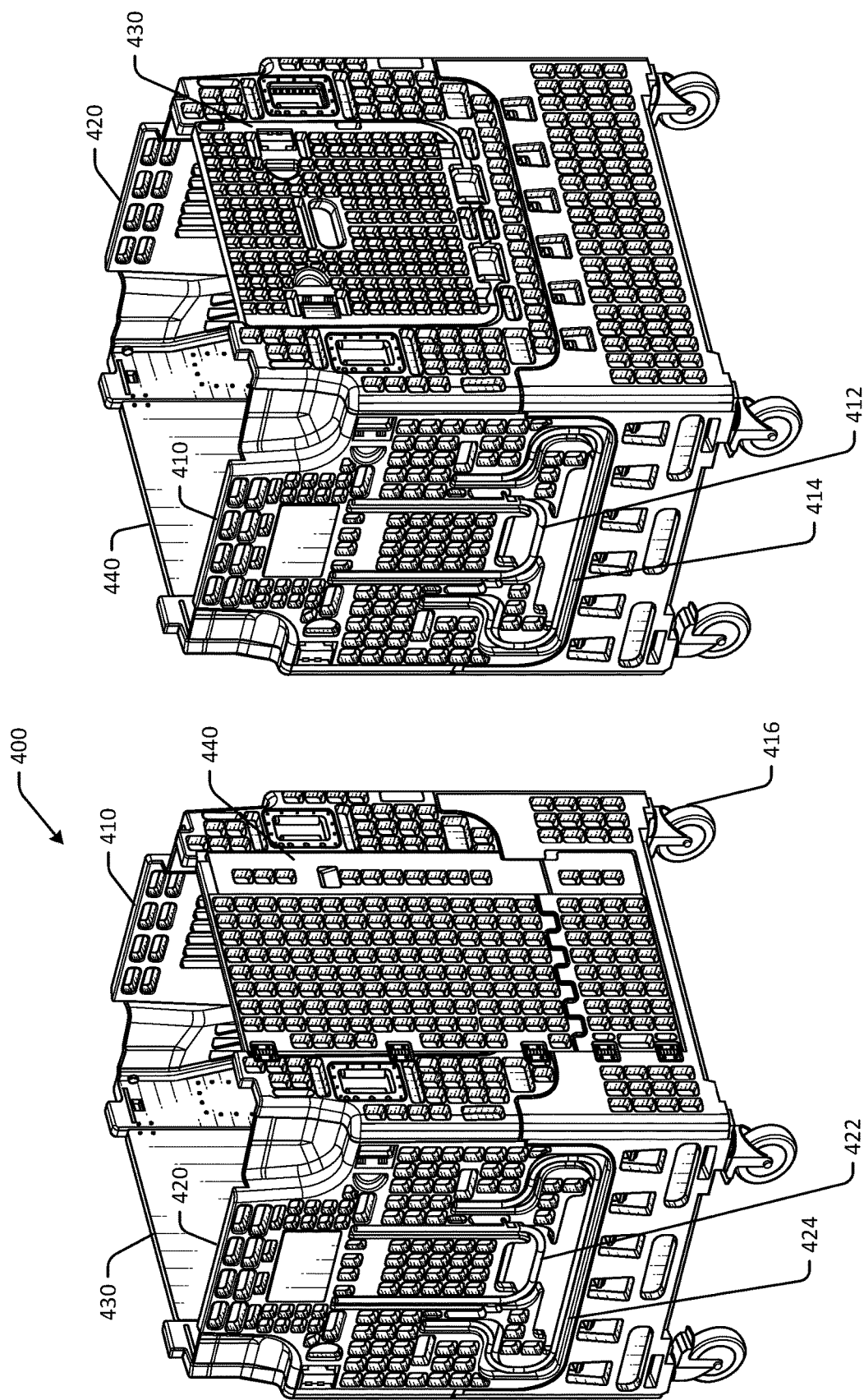
FIGS. 4A-4C are schematic illustrations of a various views of a container in folded, unfolded, and open door arrangements in accordance with one or more embodiments of the disclosure.
Figure 4B:
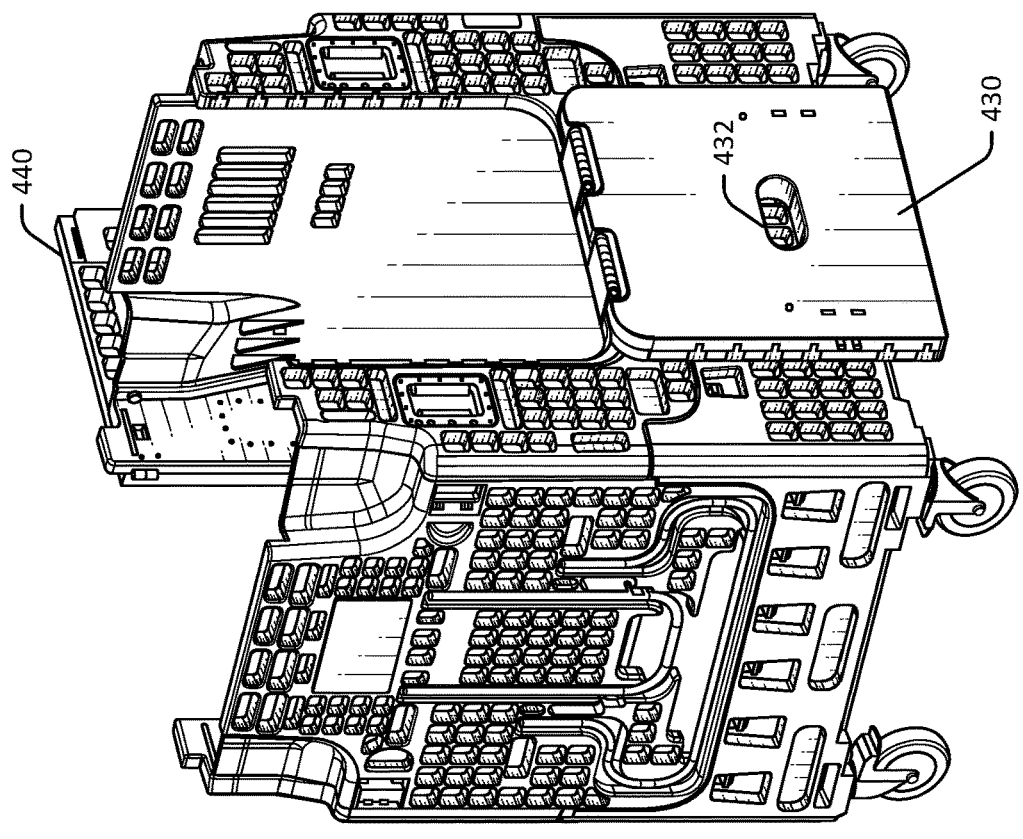
Figure 4B:
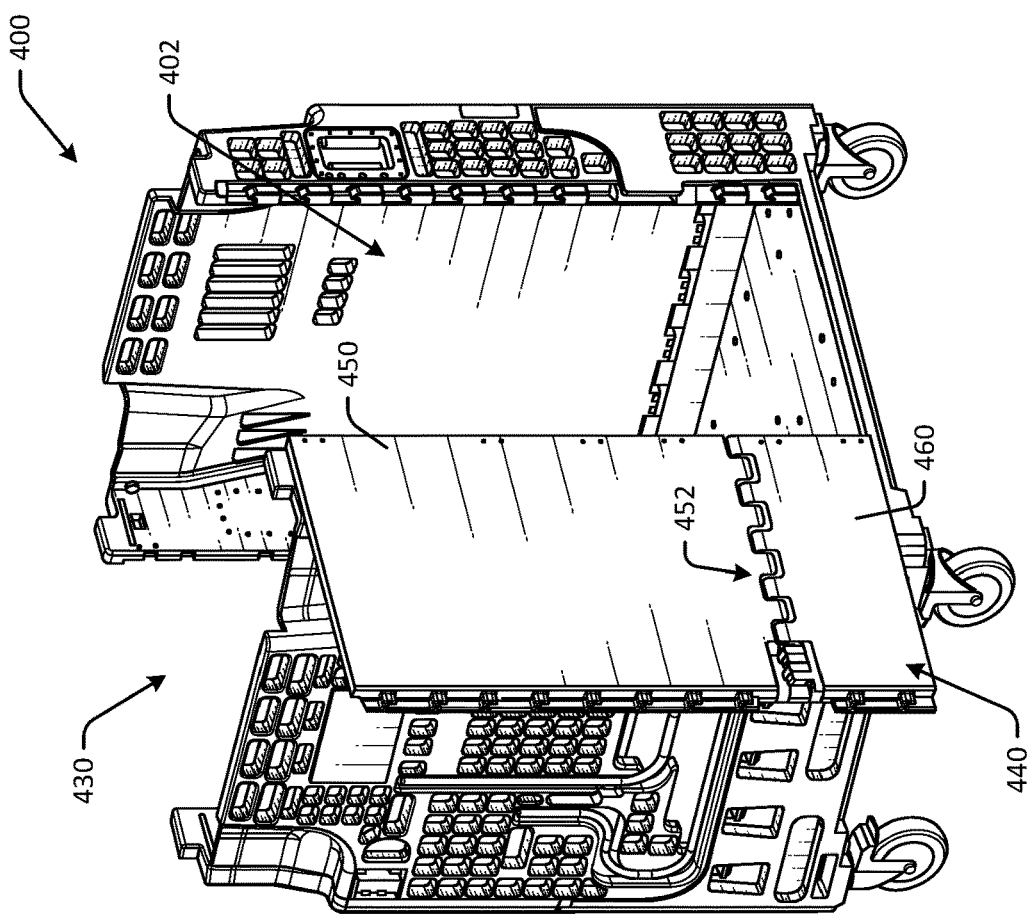
Figure 4C:
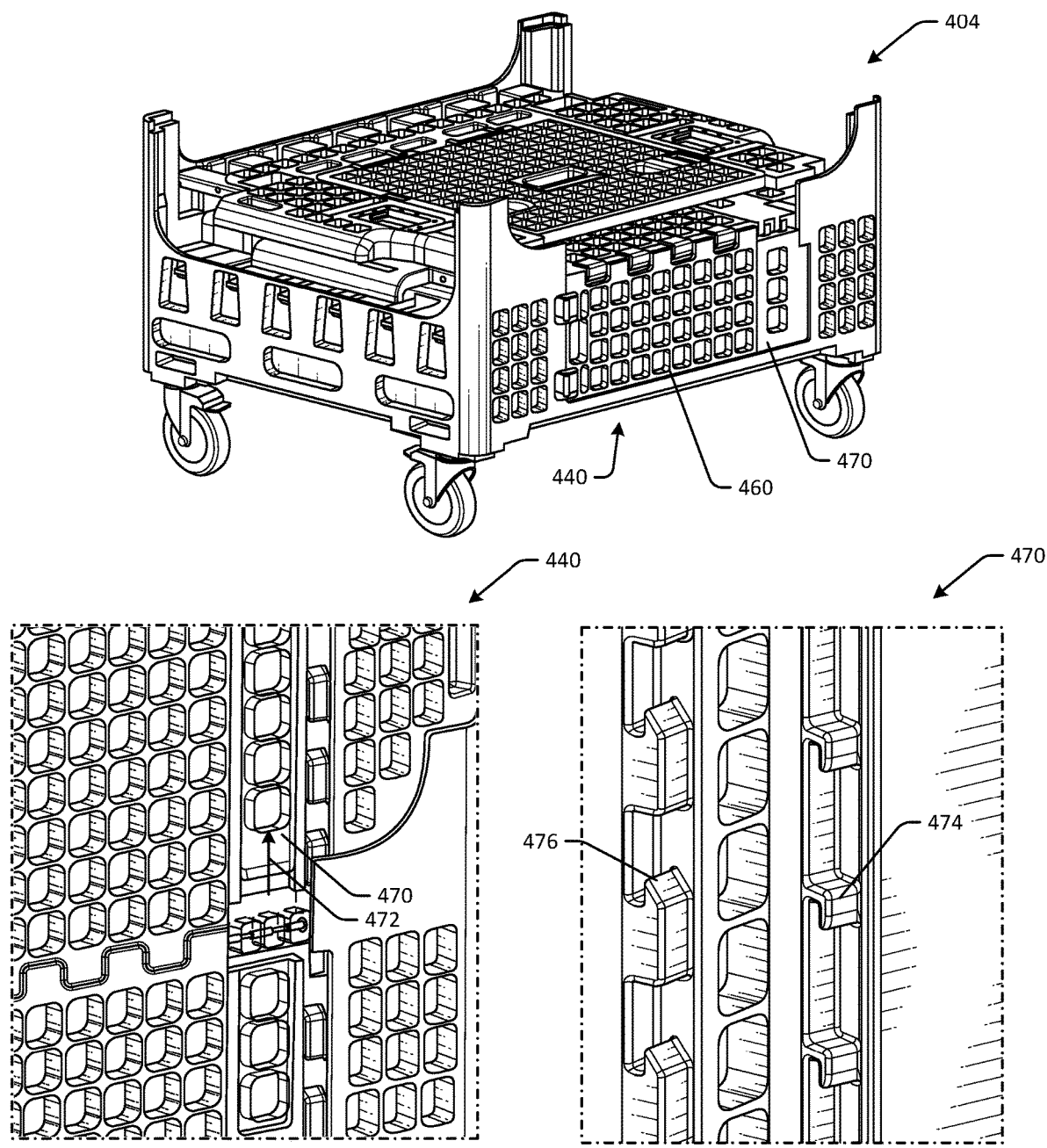

FIGS. 4A-4C are schematic illustrations of a various views of a container 400 in folded and unfolded arrangements in accordance with one or more embodiments of the disclosure. Other embodiments may include additional or fewer components. The illustrations of FIGS. 4A-4C may not be to scale, and may not be illustrated to scale with respect to other figures. The containers illustrated in FIGS. 4A-4C may be an alternate embodiment of the same container discussed earlier.

In FIG. 4A, the container 400 may have multiple handles on one or both a front wall 420 and/or a rear wall 410 of the container 400. For example, the container 400 may include a first handle 422 and a second handle 424 on the front wall 420. The first handle 422 may be used to facilitate lowering of the front wall 420 toward the center of the container 400 during folding of the container 400, and the second handle 424 may be used to push and/or pull the container 400 during manual handling. Accordingly, the first handle 422 may have a U-shaped configuration, and the second handle 424 may have a relatively wider and shorter configuration. Similarly, the container 400 may include an optional third handle 412 and/or fourth handle 414 on the rear wall 410 of the container 400. Optional spring-loaded pull handles may be disposed adjacent to the upper corners of the first sidewall and/or second sidewall to facilitate close-positioned manual movement or rotation of the container 400 (depicted in FIG. 4A). The container 400 may include one or more caster wheels 416, which may be the same as the wheels 314 described with respect to FIGS. 3A-3C.

In addition, the container 400 may be asymmetric in that the container 400 may include a first door 430 on a first sidewall of the container that is different from a second door 440 on a second sidewall of the container 400. As depicted in FIG. 4B, the first door 430 of the first sidewall may include an optional handle or hand hold 432 to facilitate lifting of the door by an operator. The container 400 may include the second door 440, which may be a full length door that extends the length of the container 400, so as to facilitate easy loading and/or unloading of an interior 402 of the container 400, as well as to provide easier access to a bottom of the container 400. The second door 440 may include an upper portion 450 and a lower portion 460 that is separated from the upper portion 450 about hinge 452. Accordingly, the upper portion 450 may hinge or pivot with respect to the lower portion 460 about the hinge 452. The second door 440 may therefore be configured to at least partially fold towards a center of the container 400. The upper portion 450 and the lower portion 460 may be coupled about the hinge 452, such that opening of the second door 440 causes both the upper portion 450 and the lower portion 460 to rotate outwards together.

As depicted in FIG. 4C, when the container 400 is in a folded or collapsed position 404, the upper portion 450 may be folded flat toward a center of the container, while the lower portion 460 remains upright or vertical and forms a portion of the base of the container 400.

The second door 440 may include a latch mechanism 470 that slides vertically to secure and release the second door 440. For example, as depicted in the close-up views of FIG. 4C, the second door may include the latch mechanism 470 that slides vertically 472 to release the second door 440 by clearing hooks 476 engaged by corresponding latches 474 to secure the second door 440. Once the hooks 476 are cleared via sliding of the latch mechanism 470, the second door 440 may be swung open. When swung closed, the second door 440 may automatically latch due to the inclined surfaces on the hooks 476 that cause the latch mechanism 470 to automatically lock.

Figure 5:
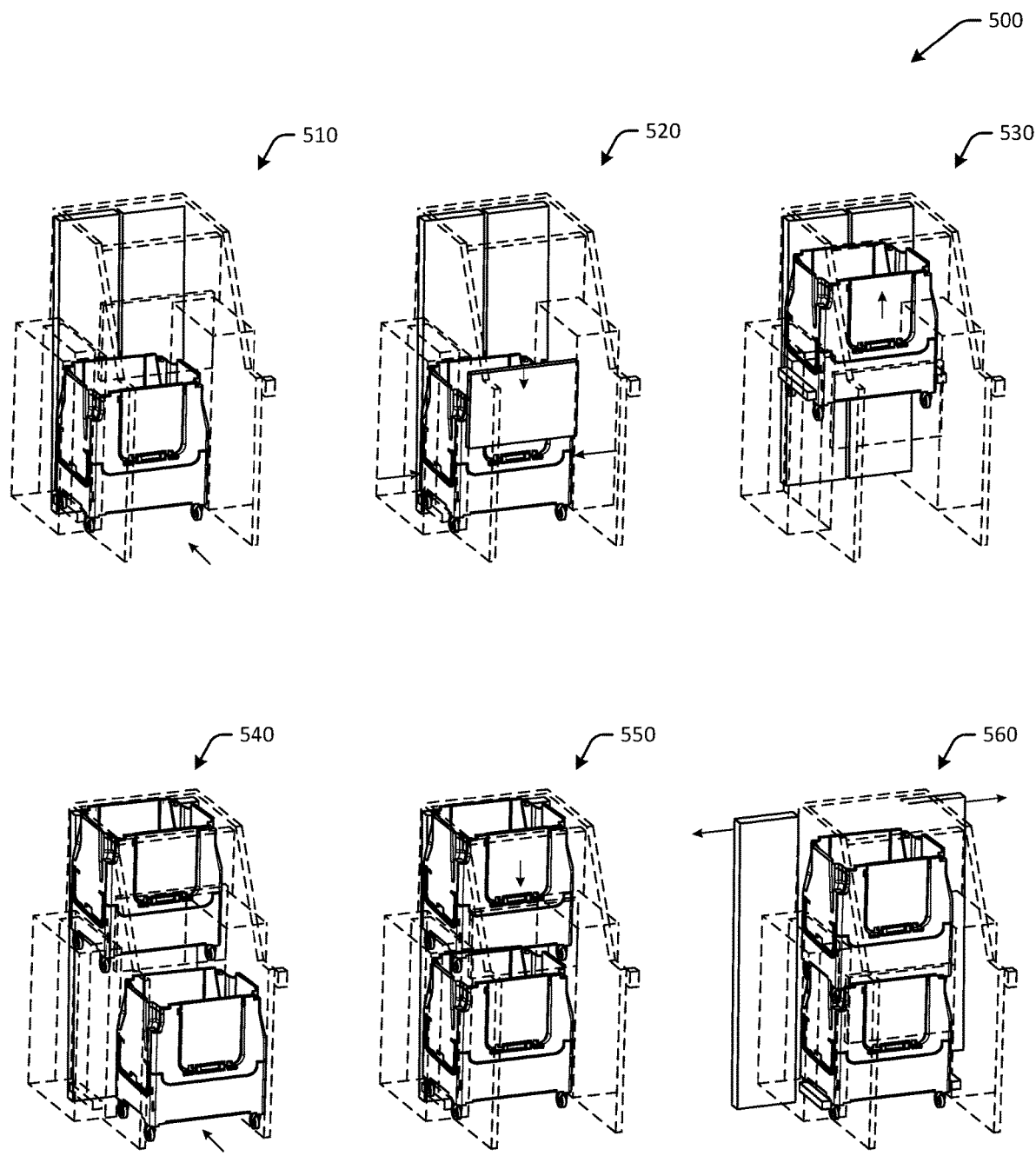
FIG. 5 is a schematic illustration of an automated container stacking station in accordance with one or more embodiments of the disclosure.

FIG. 5 is a schematic illustration of an automated container stacking station 500 in accordance with one or more embodiments of the disclosure. Other embodiments may include additional or fewer components. The illustration of FIG. 5 may not be to scale, and may not be illustrated to scale with respect to other figures. The components illustrated in FIG. 5 may be used with any of the containers or systems discussed with respect to FIGS. 1-4C.

In FIG. 5, the container stacking station 500 may be used to automate the process of stacking or unstacking containers as described herein. The container stacking station 500 may include a lifting mechanism and a front safety gate configured to receive a container for stacking. At a first instance 510, a first container may be loaded into the container stacking station 500. At a second instance 520, the front safety gate may be lowered and the lifting mechanism may engage the container. At a third instance 530, the first container may be lifted upwards. At a fourth instance 540, the front gate may be raised and a second container may be brought into the container stacking station 500 (e.g., under the first container that is in the lifted position, etc.). At a fifth instance 550, the first container may be lowered on top of the second container with the front gate in a lowered position. At a sixth instance 560, a rear exit gate of the container stacking station 500 and/or the front gate may be opened for removal of the stacked containers, which may be completed manually or using autonomous robots. In this manner, the process of stacking filled or empty containers may be automated for improved efficiency.

In some embodiments, a system may include a container stacking unit, such as the container stacking station 500. The container stacking station 500 may include a controller configured to determine that a first container is loaded into the container stacking unit, and cause a first retractable door to close prior to causing the first container to be lifted. In some embodiments, a light curtain or other feature may be used instead of a retractable door. The controller may cause the first container to be lifted via a lifting component, and may cause the first retractable door to open after the first container is lifted. The controller may determine that a second container is loaded into the container stacking unit, where the second container is positioned below the first container, and cause the first retractable door to close after the second container is loaded into the container stacking unit. The controller may cause the first container to be lowered onto the second container via the lifting component, and may cause a second retractable door to open after the first container is lowered onto the second container. The controller may determine that the second container is in an aligned position prior to causing the first container to be lowered onto the second container. In some instances, the controller may cause caster wheels of the first container to be aligned in a center position via a caster poke component, where the caster poke component can be engaged while the container is on a ground surface or when the container is at least partially lifted.

Figure 6A:
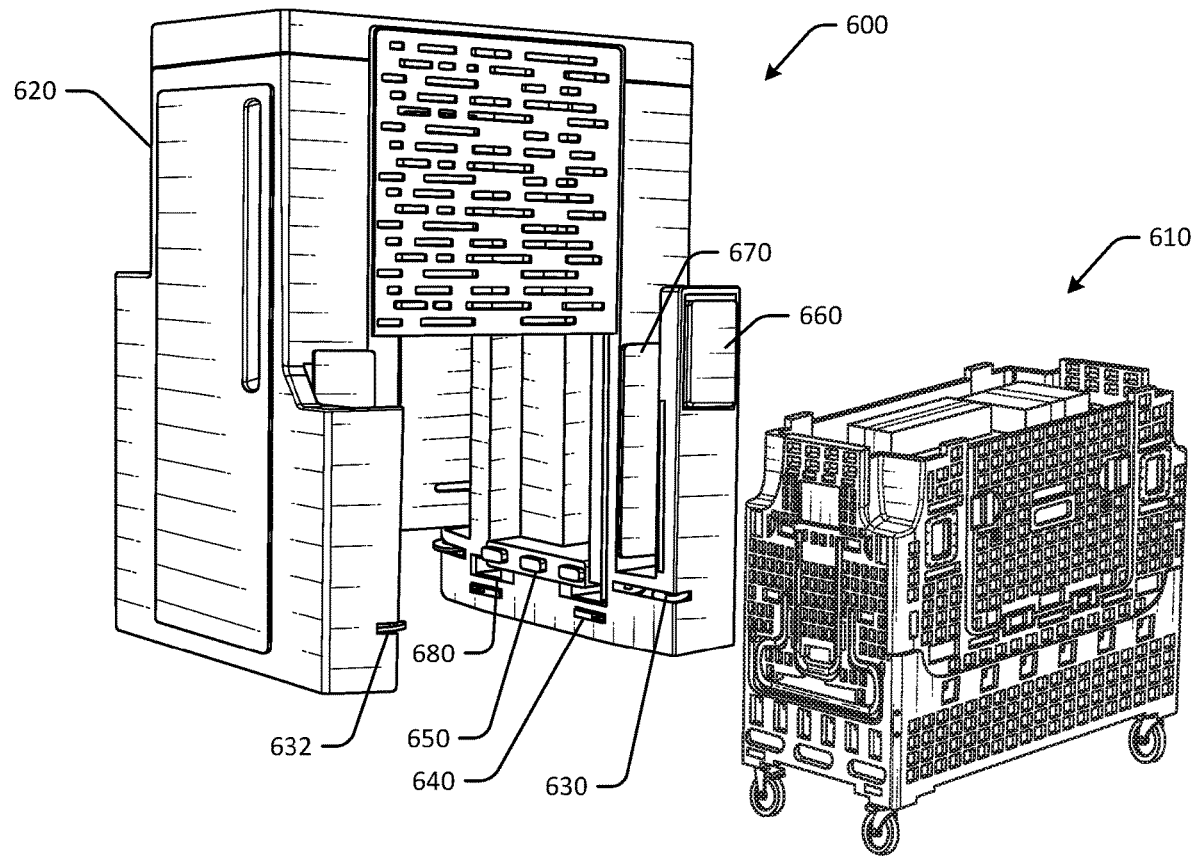
FIGS. 6A-6B are schematic illustrations of example pass through and single-sided container stacking systems in various views in accordance with one or more embodiments of the disclosure.
Figure 6A:
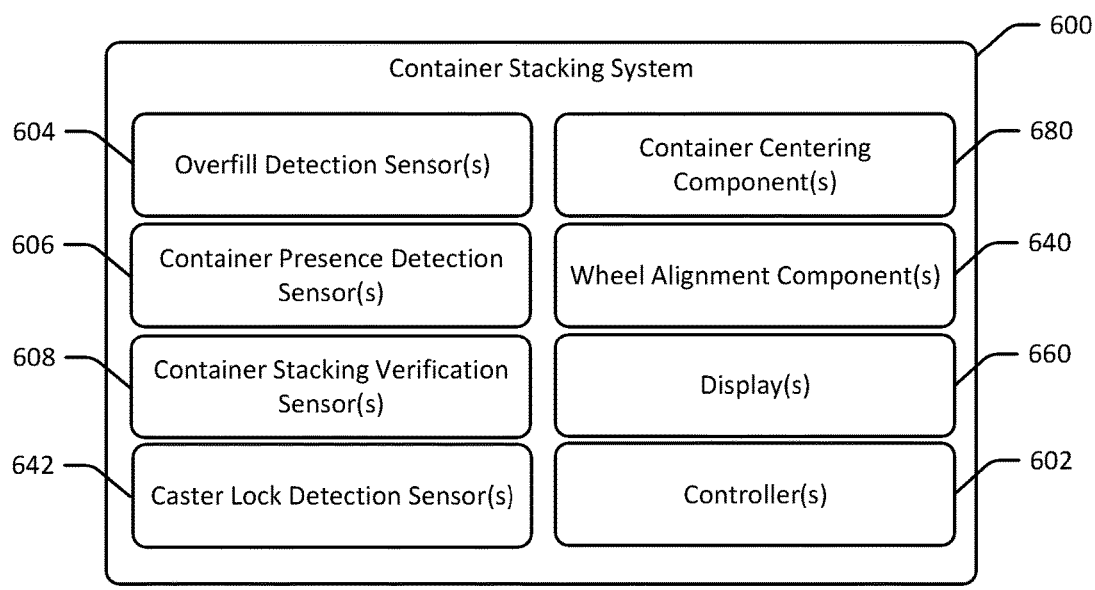
Figure 6B:
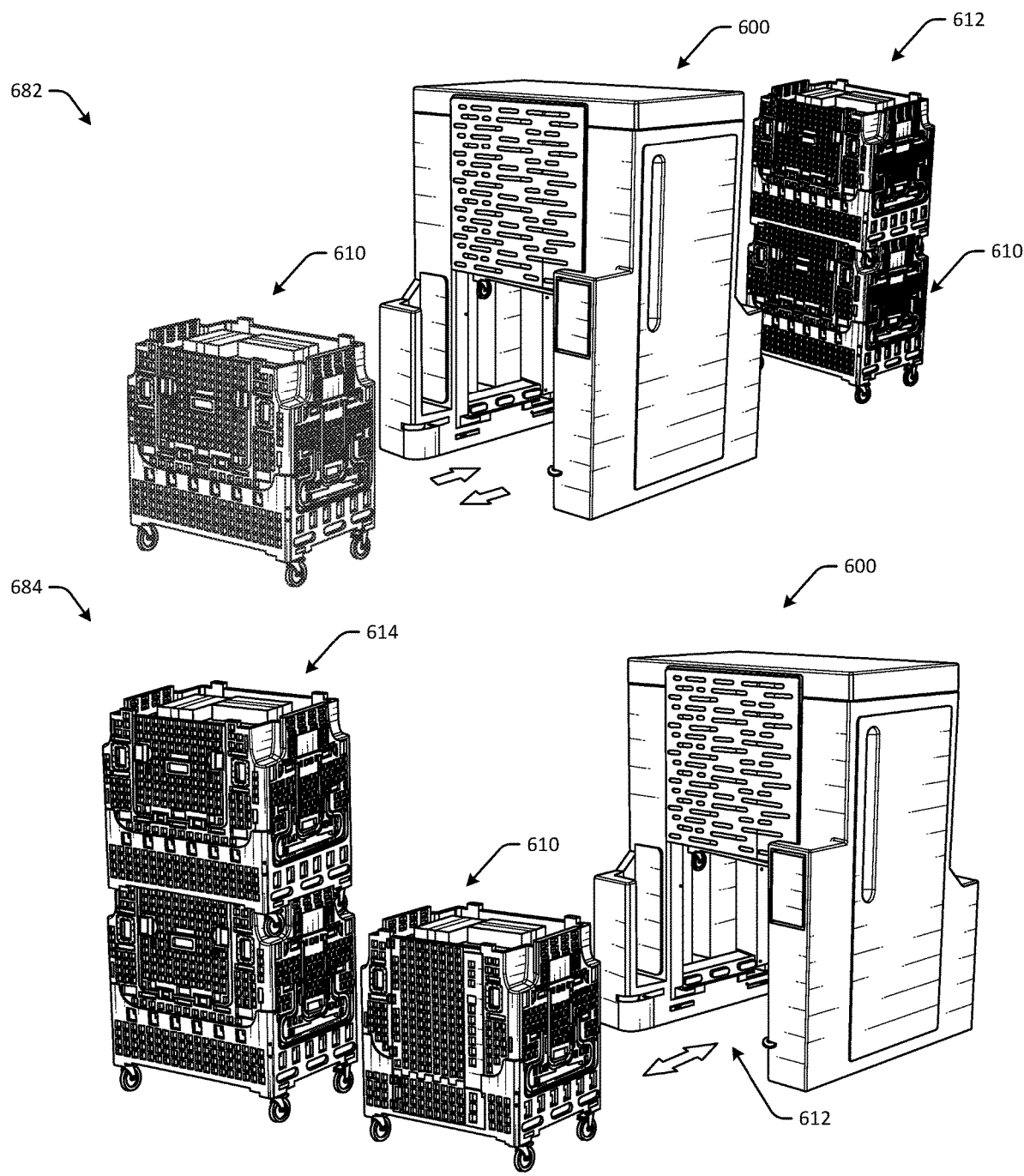

FIGS. 6A-6B are schematic illustrations of an example container stacking system 600 in various views in accordance with one or more embodiments of the disclosure. Other embodiments may include additional or fewer components. The illustrations of FIGS. 6A-6B may not be to scale, and may not be illustrated to scale with respect to other figures. The components illustrated in FIGS. 6A-6B may be used with any of the container stacking stations or systems discussed with respect to FIGS. 1-5.

The container stacking system 600 may be configured to stack and unstack containers that are filled or empty, and that are in a folded or unfolded configuration. For example, the container stacking system 600 may be configured to stack a second container 612 onto a first container 610, and/or unstack the second container 612 from the first container 610, as depicted in FIG. 6B.

In FIG. 6A, the container stacking system 600 is depicted in perspective view and in a schematic view depicting sample components. The container stacking system 600 may include a housing 620 having a first side and a second side. The housing 620 may be configured to receive containers. The first side may be a front side of the container stacking system 600, and the second side may be a rear side of the container stacking system 600. The container stacking system 600 may include one or more lifting components 650 configured to lift a container, such as the first container 610, from a first position to a second position. The first position may be a ground level position and the second position may be a height greater than or equal to the height of the container on which the first container 610 is to be stacked. The container stacking system 600 may be configured to lower the first container 610 from the second position to a third position via the lifting component 650, such that the first container 610 is stacked on a second container (after the second container is received by the container stacking system 600 while the first container is lifted to the second position). In instances where the second position is greater than the height of the second container, the third position may be at a vertical position relatively lower than the second position (e.g., between the first position and the second position, etc.). The container stacking system 600 may be configured to unstack the first container and the second container via the lifting component 650 (e.g., as described with respect to FIG. 6B, where the top stacked container is lifted, the bottom container is removed, and the top stacked container is lowered to ground level via the lifting component 650. The lifting component 650 may include one or more members configured to engage a lower area of the container. For example, the lifting component 650 may include a first member configured to engage a first side or first lower surface portion of the container, and a second member configured to engage a second side or second lower surface portion of the container.

The container stacking system 600 may include a container centering component 680 that may be configured to align a container with a center position, or substantially align a container with a center position (e.g., within a predetermined region of the container stacking system 600, etc.), of the housing 620. The container centering component 680 may include a first container engagement member and a second container engagement member. The container centering component 680 may be configured to align the first container in a predetermined position. In some embodiments, the lifting component 650 may be integrated with the container centering component 680, such that the same members are used for centering and lifting containers.

The container stacking system 600 may include a first set of guide wheels 630 disposed on a first surface of the housing 620, and a second set of guide wheels 632 disposed on a second surface of the housing 620. The guide wheels 630, 632 may be configured to guide entry and/or exit of containers into and/or out of the container stacking system 600. Any number of guide wheels may be used.

The container stacking system 600 may include a wheel alignment component 640 that can be used to align the caster wheels of a container in a center position to facilitate stacking of the container on top of another container. The wheel alignment component 640 may include a caster poke component or other member configured to extend from an interior portion of the housing 620, where the member is configured to poke or otherwise engage individual caster wheels of the first container, or orient individual wheels into a particular orientation. Any number of wheel alignment components 640 may be disposed in the housing 620. In some embodiments, the wheel alignment component 640 may be disposed at a vertical position to engage the caster wheels at ground level, whereas in other embodiments, the wheel alignment component 640 may be disposed at another vertical position, so as to engage the caster wheels at a fully lifted or partially lifted vertical position.

The container stacking system 600 may include a display 660 configured to receive user input. In some embodiments, the container stacking system 600 may be controlled via the display 660, whereas in other embodiments, the container stacking system 600 may receive remote commands from a separate controller or computer system. The container stacking system 600 may have an onboard or remote controller 602 to control operations of the container stacking system 600.

The container stacking system 600 may optionally include one or more retractable doors 670. The doors 670 may be configured to slide open to reduce a footprint of the container stacking system 600. In some embodiments, a light curtain or other sensors may be used instead of doors 670.

The container stacking system 600 may include one or more sensors. For example, the container stacking system 600 may include a first sensor, such as a container presence detection sensor 606, which may be configured to detect presence of the first container in the housing 620. The container stacking system 600 may include a second sensor, such as an overfill detection sensor 604, configured to detect overfilling of the first container prior to initiating a stacking operation. The container stacking system 600 may include a third sensor, such as a container stacking verification sensor 608, configured to detect or validate container stacking completion of the first container on the second container. The container stacking system 600 may include a fourth sensor, such as a caster lock detection sensor 642, configured to detect whether a caster lock is activated, and if so, generate a request for manual intervention. The sensors may be placed at different locations in the housing 620. For example, the first sensor may be disposed at a center portion of the housing 620 to detect that a container has been received by the container stacking system 600. The second sensor may be positioned at a height of the container to determine whether items extend beyond a top end of the container. The third sensor may be disposed at a top portion (e.g., downward looking, etc.) of the housing 620. The fourth sensor may be disposed adjacent to the wheel alignment component 640, and so forth. More than one sensor may be used for the same function. Any suitable sensor type may be used, such as proximity sensors, infrared sensors, camera sensors, light-based sensors, and so forth.

The container stacking system 600 may have a static location or may be mobile. For example, the container stacking system 600 may have a base platform 622, where the system can be configured to be lifted and transported via the base platform 622. In some embodiments, the container stacking system 600 may be configured to autonomously navigate to different locations.

In FIG. 6B, at a first instance 682, the container stacking system 600 may be configured to stack the second container 612 on top of the first container 610, where the first container 610 is positioned under the second container 612, after the container stacking system 600 lifts the second container 612. The stacked containers can then exit the rear side of the container stacking system 600. In the embodiment of FIG. 6B, the containers may enter the system on a first side of the housing 620 and exit the system on a second side of the housing 620. In such instances, the container stacking system 600 may include a first retractable door on the first side of the housing 620, and a second retractable door on the second side of the housing 620.

At a second instance 684, the container stacking system 600 may be configured to unstack containers. For example, the second container 612 may be lifted, the first container 610 may be removed from the container stacking system 600, and then the second container 612 may be lowered and removed from the container stacking system 600 to unstack the containers. Additional container stacks 614 may be automatically unstacked.

Figure 7A:
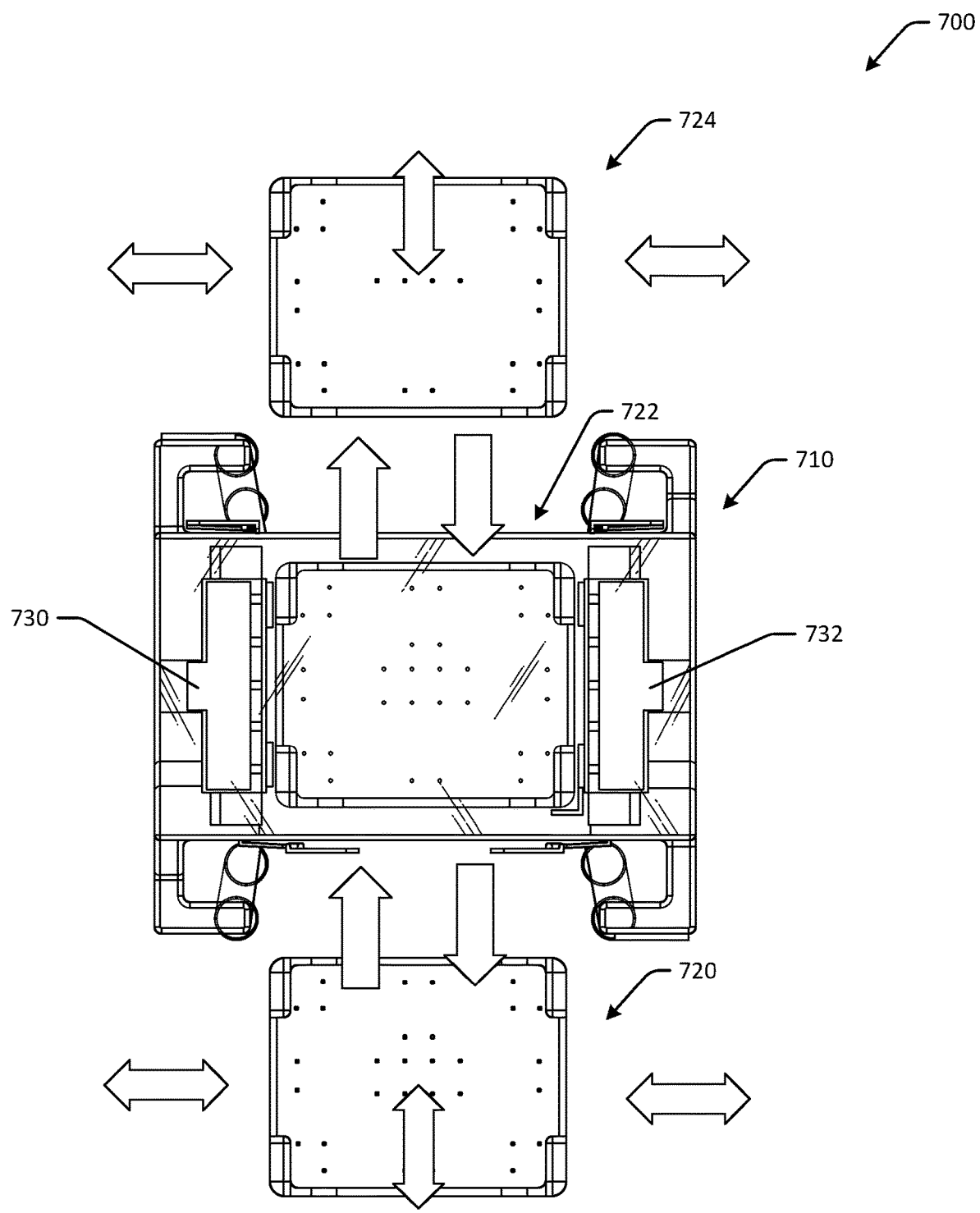
FIGS. 7A-7B are schematic illustrations of example container stacking system architectures in accordance with one or more embodiments of the disclosure.
Figure 7B:
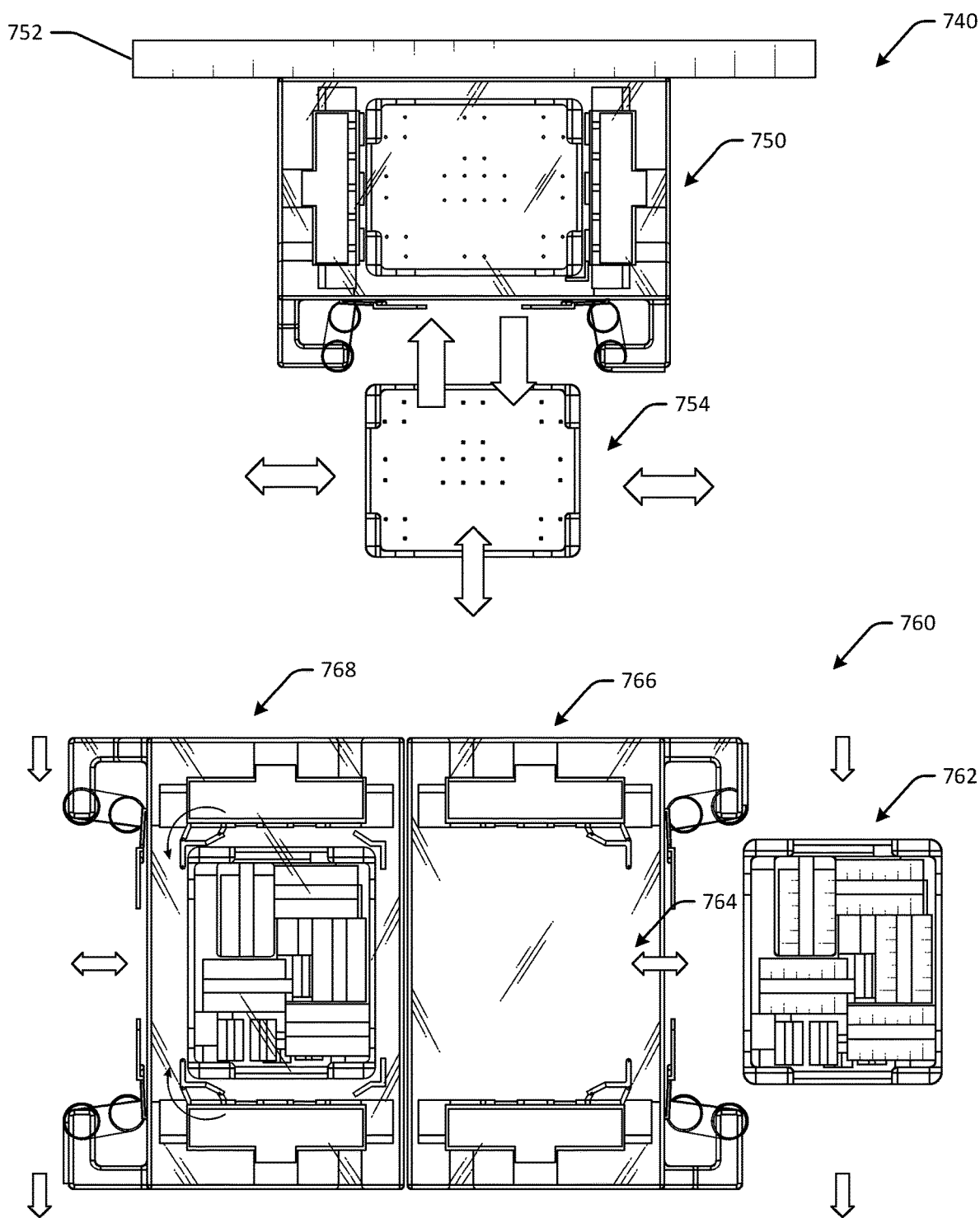
Figure 7C:
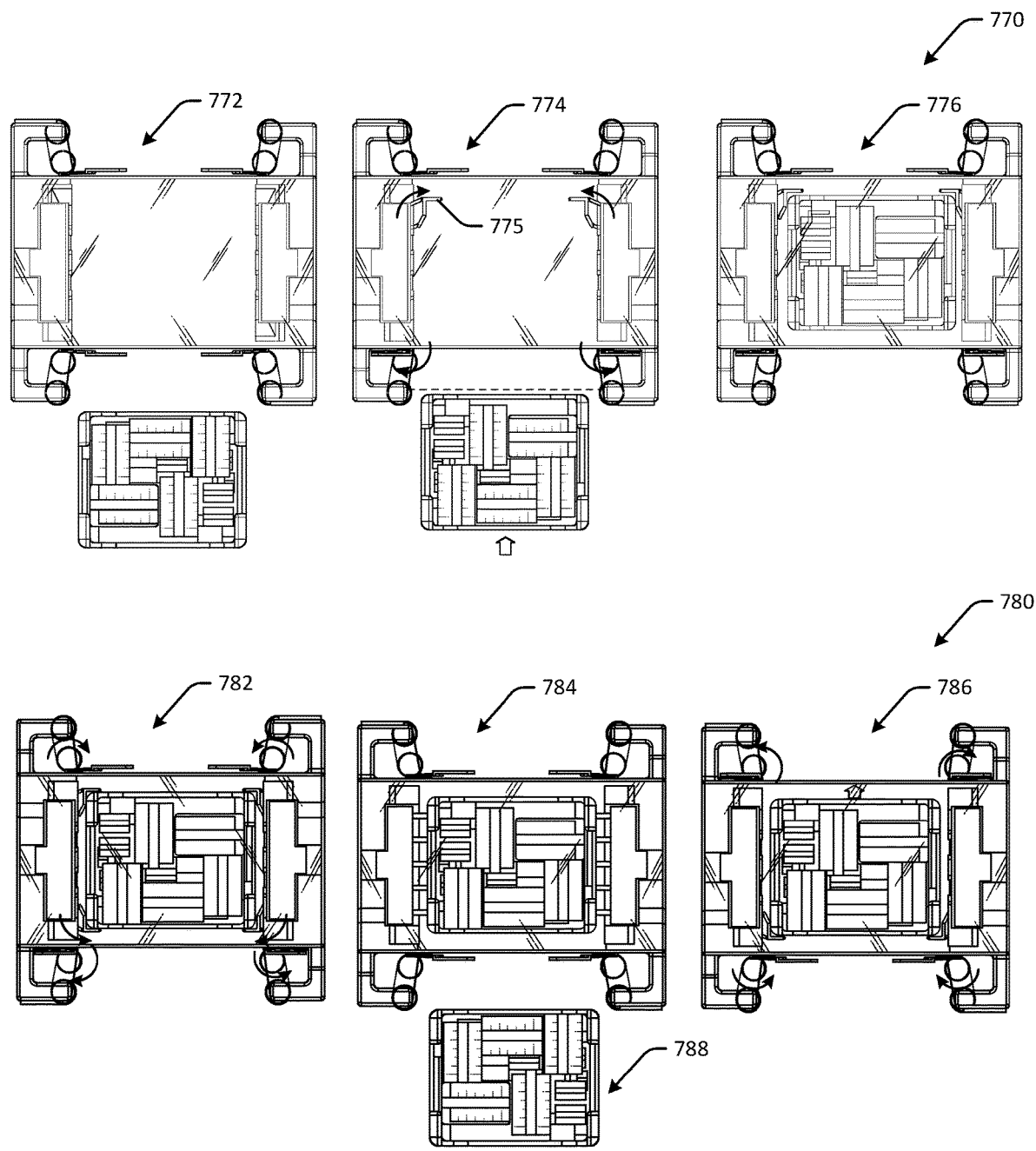
FIG. 7C depicts an example container stacking system workflow in accordance with one or more embodiments of the disclosure.
Figure 7D:
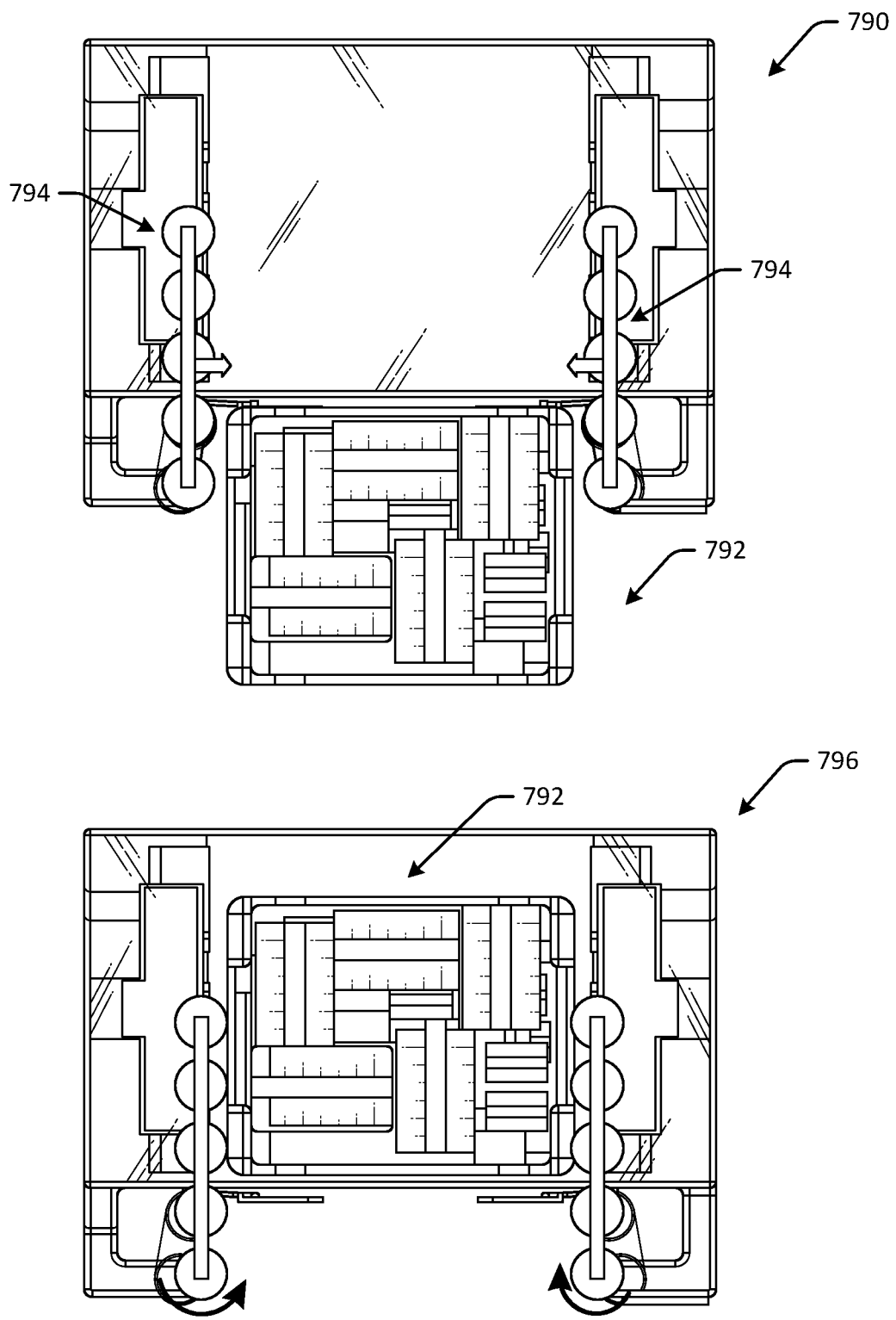
FIG. 7D depicts an alternate example container stacking system in accordance with one or more embodiments of the disclosure.

FIGS. 7A-7B are schematic illustrations of example container stacking system architectures in accordance with one or more embodiments of the disclosure. FIG. 7C depicts an example container stacking system workflow in accordance with one or more embodiments of the disclosure. FIG. 7D depicts an alternate example container stacking system in accordance with one or more embodiments of the disclosure. Other embodiments may include additional or fewer components. The illustrations of FIGS. 7A-7D may not be to scale, and may not be illustrated to scale with respect to other figures. The components illustrated in FIGS. 7A-7D may be used with any of the containers or systems discussed with respect to FIGS. 1-6B.

In FIG. 7A, an example pass through container stacking workflow is depicted for a container stacking system 700. Containers (stacked or unstacked) may enter and exit through either side a housing 710 of the container stacking system 700. For example, unstacked containers 720 may enter the container stacking system 700, centered in center portion or predetermined portion 722, and lifted using lift components 730, 732. Stacked containers 724 may exit the opposite side of the system. In other instances, the same side can be used for entry and exit. For unstacking, the opposite workflow can be used.

In FIG. 7B, for areas with compact footprint requirements, a container stacking system 740 may be positioned against a surface 752, such as a wall or column, and containers 754 can enter a housing 750 of the container stacking system 740 for stacking, and the stacked containers can exit via the same side of the housing 750 used for entry.

For single sided stacking systems, more than one system can be placed back to back. For example, in embodiment 760, a first container stacking system 766 and a second container stacking system 768 may be positioned back to back, where one system can be used for stacking, and another for unstacking. For example, stacked containers 762 can enter a housing 764 of the first container stacking system 766 for unstacking, and unstacked containers can enter a housing of the second container stacking system 768 for stacking.

In FIG. 7C, an example process flow 770 is depicted for receiving and centering a container. At a first instance 772, the container may be placed in front of the container stacking system. At a second instance 774, the container may pass through the light curtain and/or retractable door of the container stacking system (e.g., the light curtain may trigger opening of the retractable doors, etc.), and a centering mechanism 775 may be used to engage the container and provide a hard stop at a center portion of the container stacking system. The centering mechanism 775 may include L-shaped components that can move into position to center unstacked containers. At a third instance 776, the container may be pushed against the centering mechanism to ensure the container is aligned and/or centered prior to lifting. In one example, for pass through container stacking systems, when a container is inducted, the centering mechanism 775 may include front L-shaped components that are actuated prior to the full container insertion, acting as a hard stop. After the cart is inserted and placed against the hard stops, the centering mechanism 775 may include rear L-shaped components that are actuated and will position or center the container inside the cell within an allowable region.

An example process flow 780 for lifting the container may include, at a fourth instance 782, detecting presence of the container and validating alignment or centering in the housing. At a fifth instance 784, the container may be engaged via the lifting component and lifted partially (e.g., 50 mm, etc.), and one or more of the caster wheels may be poked via a wheel alignment member or component for instances where caster wheels are not self-aligning when lifted. The container may then be fully lifted while a second container 788 is placed in front of the container stacking system. At a sixth instance 786, the second container 788 is received by the container stacking system and centered and/or aligned and the first container is lowered onto the second container 788. The second container 788 may be held in place by the centering component and/or lift component of the container stacking system while the first container is stacked on top. The container stacking system may disengage the stacked containers and the retractable doors may open to allow exit of the stacked containers.

In FIG. 7D, for one-sided container stacking systems, such as a container stacking system 790, the container stacking system 790 may be configured to receive containers 792 using active drive wheels 794 that drive and position the container 792 in a predetermined position. As depicted at a second instance 796, the container 792 may be received by the container stacking system 790, and the guide wheels may be used to actively move and position the container 792 in the system instead of a discrete centering component.

One or more operations of the methods, process flows, or use cases of FIGS. 1-7D may have been described above as being performed by a user device, or more specifically, by one or more program module(s), applications, or the like executing on a device. It should be appreciated, however, that any of the operations of the methods, process flows, or use cases of FIGS. 1-7D may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7D may be described in the context of the illustrative devices, it should be appreciated that such operations may be implemented in connection with numerous other device configurations.

The operations described and depicted in the illustrative methods, process flows, and use cases of FIGS. 1-7D may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7D may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
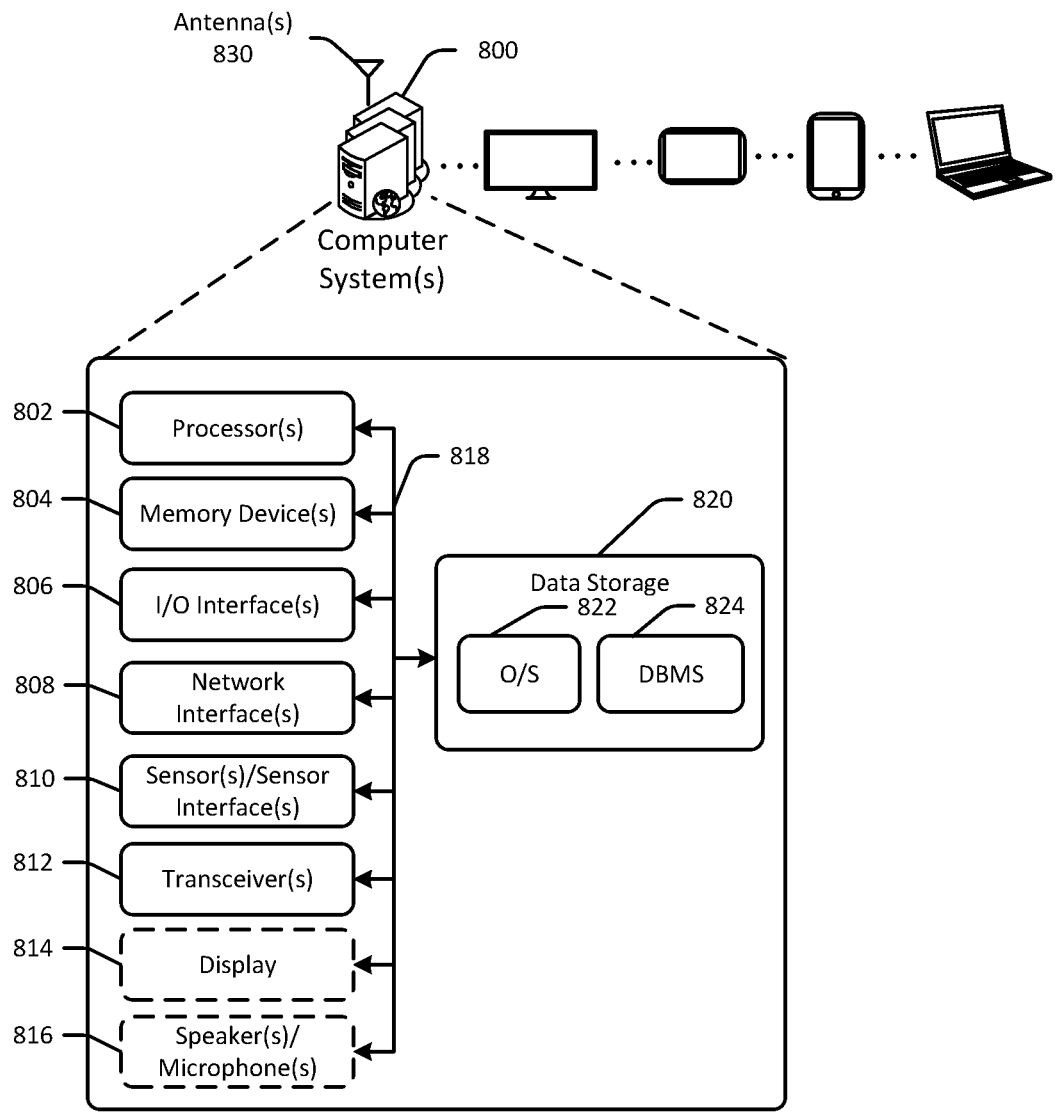
FIG. 8 schematically illustrates an example architecture of a computer system associated with a container stacking system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the robotic system(s) of FIGS. 1-7D, such as container stacking units or systems, robotic manipulators and/or autonomous robotic vehicles.

The computer system(s) 800 may be configured to communicate with one or more servers, user devices, or the like. The computer system(s) 800 may be configured to cause the stacking systems to stack or unstack containers, and/or robotic system(s) to deposit containers into one or more pods, retrieve containers, transport containers, dump containers, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7D may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7D may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7D may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container stacking system comprising:
a housing having a first side and a second side;
a wheel alignment component configured to extend from an interior portion of the housing;
a lifting component configured to lift a first container from a first position to a second position, and to lower the first container from the second position to a third position, such that the first container is stacked on a second container, wherein the system is further configured to unstack the first container and the second container via the lifting component, wherein the wheel alignment component is configured to orient a caster wheel of the first container;
a container centering component comprising a first container engagement member and a second container engagement member, the container centering component configured to align the first container in a predetermined position, wherein the first container engagement member is disposed on the first side, and the second container engagement member is disposed on the second side, and wherein the first container engagement member and the second container engagement member comprise L-shaped configurations to provide a hard stop for containers entering the system;
a first retractable door on the first side of the housing; and
a second retractable door on the second side of the housing, wherein the first container and the second container enter the system on the first side of the housing and exit the system on the second side of the housing.

2. The container stacking system of claim 1, further comprising:
a controller configured to:
determine that a first container is loaded into the container stacking unit;
cause the first container to be lifted via a lifting component;
determine that a second container is loaded into the container stacking unit, wherein the second container is positioned below the first container; and
cause the first container to be lowered onto the second container via the lifting component.

3. The container stacking system of claim 1, further comprising:

a first sensor configured to detect presence of the first container in the housing;
a second sensor configured to detect overfilling of the first container; and
a third sensor configured to detect container stacking completion of the first container on the second container.

4. A system comprising:
a housing having a first side and a second side;
a first set of guide wheels disposed on a first surface of the housing;
a second set of guide wheels disposed on a second surface of the housing;
a lifting component configured to lift a first container from a first position to a second position, and to lower the first container from the second position to a third position, such that the first container is stacked on a second container; and
a container centering component comprising a first container engagement member and a second container engagement member, the container centering component configured to align the first container in a predetermined position.

5. The system of claim 4, wherein the system is further configured to unstack the first container and the second container via the lifting component.

6. The system of claim 4, wherein the first container and the second container enter the system on the first side of the housing and exit the system on the second side of the housing.

7. The system of claim 6, further comprising:
a first retractable door on the first side of the housing; and
a second retractable door on the second side of the housing.

8. The system of claim 4, wherein the first container and the second container enter the system on the first side of the housing, and exit the system on the first side of the housing.

9. The system of claim 4, further comprising:
a wheel alignment component configured to extend from an interior portion of the housing, the wheel alignment component configured to engage a caster wheel of the first container.

10. The system of claim 4, further comprising:
a first sensor configured to detect presence of the first container in the housing;
a second sensor configured to detect overfilling of the first container; and
a third sensor configured to detect container stacking completion of the first container on the second container.

11. The system of claim 4, wherein the first container has a first set of dimensions, and the second container has a second set of dimensions that is different than the first set of dimensions.

12. The system of claim 11, wherein the first container is in a folded configuration and the second container is in an unfolded configuration during stacking.

13. The system of claim 4, further comprising:
a base platform;
wherein the system is configured to be lifted and transported via the base platform.

14. The system of claim 4, wherein the first container engagement member is disposed on the first side, and the second container engagement member is disposed on the second side, and wherein the first container engagement member and the second container engagement member comprise L-shaped configurations to provide a hard stop for containers entering the system.

15. A system comprising:
a container stacking unit comprising a controller, the controller configured to:
determine that a first container is loaded into the container stacking unit;
cause the first container to be lifted via a lifting component;
determine that a second container is loaded into the container stacking unit,
wherein the second container is positioned below the first container; and
cause the first container to be lowered onto the second container via the lifting component.

16. The system of claim 15, wherein the controller is further configured to:
cause a first retractable door to close prior to causing the first container to be lifted;
cause the first retractable door to open after the first container is lifted;
cause the first retractable door to close after the second container is loaded into the container stacking unit; and
cause a second retractable door to open after the first container is lowered onto the second container.

17. The system of claim 15, wherein the controller is further configured to:
determine that the second container is in an aligned position prior to causing the first container to be lowered onto the second container.

18. The system of claim 15, wherein the controller is further configured to:
cause caster wheels of the first container to be aligned in a center position via a caster poke component.

* * * * *